Feb. 17, 1970     R. N. FOSTER     3,495,521
MANUAL ADJUSTABLE CONTROL FOR AIR VALVE DAMPERS
Filed May 8, 1968
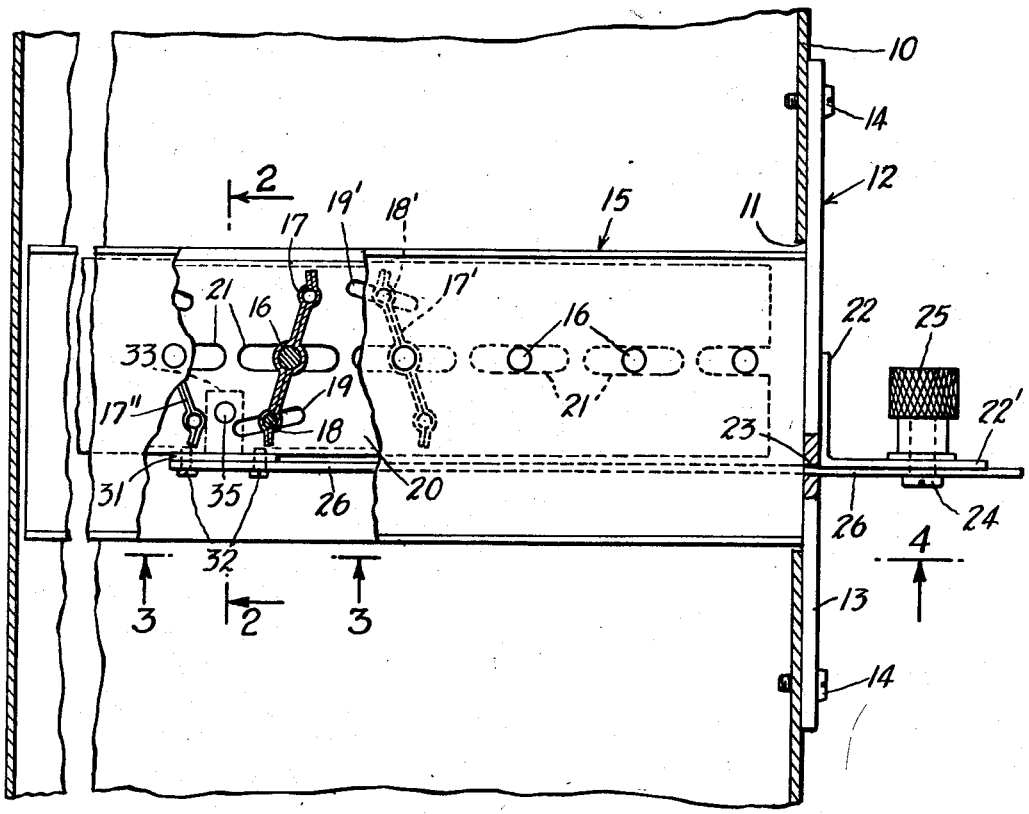
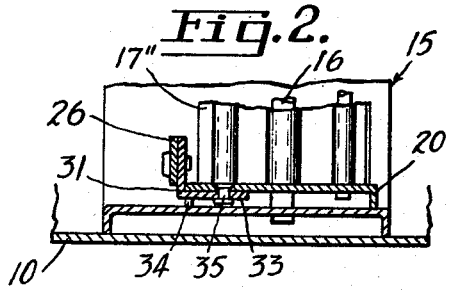
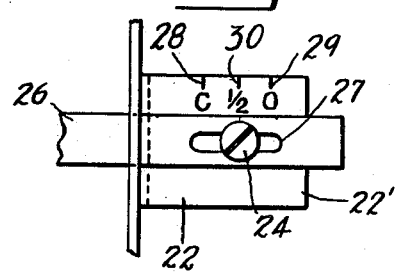
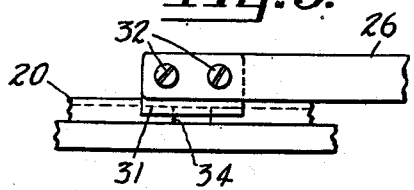
INVENTOR.
RICHARD N. FOSTER
BY
Howard E. Thompson
ATTORNEY

United States Patent Office 3,495,521
Patented Feb. 17, 1970

3,495,521
MANUAL ADJUSTABLE CONTROL FOR AIR VALVE DAMPERS
Richard N. Foster, 160 Rock Hill Road, Clifton, N.J. 07013
Filed May 8, 1968, Ser. No. 727,433
Int. Cl. F24f *13/14;* F16k *37/00*
U.S. Cl. 98—41     2 Claims

ABSTRACT OF THE DISCLOSURE

An air valve damper wherein manual adjustable means is employed for controlling and fixing the opening and closing positions of the louvers of the damper in regulating flow through a duct in various heating and cooling apparatus and, particularly, in zone controls of multiple zone systems.

---

Still further, the invention deals with a control and regulator of the character defined which is simple and economical in construction and which can be applied to air valve dampers of various types and kinds.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional broken view through a duct, showing, in plane and broken away section, an air valve damper, with the manual adjustable control coupled therewith.

FIG. 2 is a partial section on the line 2—2 of FIG. 1.

FIG. 3 is a detail view looking generally in the direction of the arrows 3—3 of FIG. 1; and FIG. 4 is a detail view looking in the direction of the arrow 4 of FIG. 1.

In various types and kinds of heating and cooling systems, a problem arises in controlling the flow of air to a particular duct outlet, especially in multiple zone installations and it is the object of this invention to provide manually adjustable means to adjust positions of the louvers of an air valve damper to satisfy the requirements in the zone serviced thereby.

The invention deals generally with, and by way of illustrating one adaptation and use, air valve dampers as disclosed in prior Letters Patent granted to me as follows, Patent No. 3,282,504 issued Nov. 1, 1966 and Patent No. 3,366,141 issued Jan. 30, 1968. In these patents, the dampers are automatically controlled and operated. With the present construction, these automatic controls are eliminated and the manual adjustable control forming the subject of this disclosure is employed.

Considering FIG. 1 of the drawing, 10 illustrates, in section, a part of a duct of a heating and cooling system. At a suitable location in this duct, an aperture 11 is formed for the mounting of an air valve damper, generally identified by the reference character 12. The damper 12 has a front mounting plate 13 fully covering the aperture 11 and attached to the duct 10 by a suitable number of screws 14.

The plate 13 supports a damper casing, generally identified by the reference character 15. Mounted on a series of pivot rods 16 are louvers, one only of which is shown in section at 17. All of these louvers are of the same structure and include, at one side thereof, pins 18, which operate in elongated angular apertures 19 of a slide 20, back and forth movement of which actuates the louvers to move the same into a fully open and fully closed position, or any intermediate open position such, for example, as diagrammatically illustrated by the louver 17 and the louver 17', indicated in dotted lines in FIG. 1. Part also of another adjacent louver is indicated at 17" to clearly indicate that pins 18 are disposed at different sides on alternate louvers. For example, the pin of the louver 17 is indicated at 18. Pins, such as 18', operate in apertures 19' at the opposed side of the slide 20. The slide also has longitudinally spaced elongated apertures 21, in which the pivot pins 16 operate. This brief description of the damper is deemed to be sufficient for a complete understanding of the use of the manual control forming the subject matter of this invention. The manual control comprises an angleiron plate 22 suitably fixed to the outer surface of the plate 13 adjacent an aperture 23 formed in the plate 13. Suitably supported in the outwardly extending part 22' of the plate 22 is a threaded pin or screw 24 supporting a manually actuated milled nut 25 operating as a clamp nut to securely retain an elongated actuating bar 26 in different adjusted positions.

The bar 26 is arranged on the surface of 22' and is clamped to this surface by the head of the pin or screw 24. The bar 26 has an elongated aperture 27 therein, facilitating movement of the bar over the pin or screw 24 in movement of the louvers 17 into a fully closed position, as indicated by the marking 28 on said surface of 22' or to a fully open position, as indicated by the marking 29, or any other position inbetween these positions as, for example, a half-open position, as indicated by the marking 30. The bar 26 extends into the casing 15 at one side of the slide 20, as clearly seen in FIGS. 1 and 2 and supports, at its inner end, an L-shaped bracket coupling 31.

The coupling 31 has a wide upstanding plate, to the surface of which the bar 26 is fixed, as by screws 32. The lower portion of the coupling 31 is reduced, as seen at 33 in FIG. 1, and this reduced lower portion extends through an aperture 34 formed in the side of the slide 20, note FIGS. 2 and 3, and is arranged on the lower surface of the slide and is coupled with the slide by a rivet or the like 35.

From the foregoing, it will be apparent that, as the rod or bar 26 is moved inwardly and outwardly in adjustment of the setting of the louvers to the desired open position, the slide 20 is moved in actuating the louvers, turning them on their fixed pivots 16, as will be apparent. From time to time, the setting of the louvers can be varied by manual operation of the milled nut 25 to provide the desired circulation of air to suit any prevailing condition in the room or zone controlled by the duct, in which the air valve damper is arranged in the passage of heated as well as cooled air through said duct.

It will be apparent that the bar, rod or element 26, plus the bracket 22 and the clamp member assemblage and the bracket 31 comprises an assemblage and, as such, is an article of manufacture, which can be sold for mounting or assemblage with air valve dampers of any type and kind by simply making slight changes in the damper. For example, in the damper shown, the apertures 23 and 34 will be formed, as well as the hole for reception of the rivet or other coupling 35.

Having fully described my invention, what I claim as new an desire to secure by Letters Patent is:

1. In heating and cooling systems employing air ducts extending to independent zone areas, with air valve dampers mounted in ducts leading to such areas, a damper comprising a casing, a plate at one end of the casing for mounting the damper in a duct, said casing supporting a plurality of longitudinally spaced louvers, a slide mounted in said casing and in operative engagement with said louvers for movement of the louvers into open and closed positions, each of said louvers having a central pivot rod protruding through spaced longitudinally elongated apertures in said slide and through spaced circular apertures in said casing, each louver having at one end adjacent an edge portion thereof in the plane of said louver a shorter pin, said shorter pins being positioned on opposite edges of adjacent louvers and protruding through elongated angularly disposed apertures in said slide and terminating short of said casing, said angularly disposed elongated apertures being alternately positioned on opposite sides of said longitudinal apertures and oriented at reverse but similar angles with respect to said longitudinal apertures; a louver operating assemblage comprising an elongated bar coupled with said slide in spaced relation to said plate and having an end portion projecting through said plate such that reciprocating movement of said bar imparts alternative convergent and divergent pivotal movement between adjacent louvers; and means on the outer surface of said plate and adjustably coupled with said projecting end portion of the bar for manually, slidably adjusting and securely fixing the relative positions of the louvers.

2. A damper as defined in claim 1, wherein said means comprises a bracket having a protruding part in juxtaposition to said projecting end portion of the bar, and a manually operated clamp member carried by one of said juxtaposed parts and operatively engaging an elongated aperture in the other of said juxtaposed parts.

References Cited

UNITED STATES PATENTS

| | | | |
|---|---|---|---|
| 171,071 | 12/1875 | Wallace | 137—556 |
| 843,959 | 2/1907 | McBride | 137—556 X |
| 2,878,831 | 3/1959 | Farnham et al. | 98—41 X |
| 3,196,895 | 7/1965 | Dayus | 137—601 X |

WILLIAM E. WAYNER, Primary Examiner

U.S. Cl. X.R.

49—74; 137—556, 601

UNITED STATES PATENT OFFICE
CERTIFICATE OF CORRECTION

Patent No. 3,495,521　　　　　　　　　　　　February 17, 1970

Richard N. Foster

It is certified that error appears in the above identified patent and that said Letters Patent are hereby corrected as shown below:

In the heading to the printed specification, lines 4 and 5, "Richard N. Foster, 160 Rock Hill Road, Clifton, N. J. 07013" should read -- Richard N. Foster, Clifton, N. J., assignor to Trolex Corporation, Clifton, N. J., a corporation of New Jersey --.

Signed and sealed this 6th day of October 1970.

(SEAL)
Attest:

Edward M. Fletcher, Jr.　　　　　　　　WILLIAM E. SCHUYLER, JR.
Attesting Officer　　　　　　　　　　　　　Commissioner of Patents